United States Patent
Bains et al.

(10) Patent No.: US 9,384,164 B2
(45) Date of Patent: Jul. 5, 2016

(54) MAPPING MEMORY CONTROLLER CONNECTORS TO MEMORY CONNECTORS

(71) Applicants: Kuljit S. Bains, Olympia, WA (US); James A. Mccall, Portland, OR (US)

(72) Inventors: Kuljit S. Bains, Olympia, WA (US); James A. Mccall, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 231 days.

(21) Appl. No.: 14/128,578

(22) PCT Filed: Sep. 27, 2013

(86) PCT No.: PCT/US2013/062474
§ 371 (c)(1),
(2) Date: Dec. 20, 2013

(87) PCT Pub. No.: WO2015/047352
PCT Pub. Date: Apr. 2, 2015

(65) Prior Publication Data
US 2015/0095547 A1  Apr. 2, 2015

(51) Int. Cl.
*G06F 3/06* (2006.01)
*G06F 12/14* (2006.01)
*G06F 13/42* (2006.01)

(52) U.S. Cl.
CPC .......... *G06F 13/4243* (2013.01); *G06F 3/0635* (2013.01); *G06F 12/14* (2013.01)

(58) Field of Classification Search
CPC ..... G06F 3/0622; G06F 3/0635; G06F 12/02; G06F 12/04; G06F 12/06; G06F 12/0646; G06F 12/14; G06F 13/4234; G06F 13/4243
See application file for complete search history.

(56) References Cited

U.S. PATENT DOCUMENTS

| | | | |
|---|---|---|---|
| 6,839,266 B1 | 1/2005 | Garrett, Jr. et al. | |
| 7,756,123 B1 | 7/2010 | Huang et al. | |
| 2003/0182519 A1 | 9/2003 | Riesenman et al. | |
| 2004/0165446 A1 | 8/2004 | Riesenman et al. | |
| 2004/0260991 A1 | 12/2004 | Vogt et al. | |
| 2007/0005836 A1* | 1/2007 | Jain ............... | G06F 13/4013 710/62 |
| 2009/0019323 A1 | 1/2009 | Porterfield | |
| 2009/0119443 A1 | 5/2009 | Tremaine | |
| 2011/0153925 A1* | 6/2011 | Bains ............... | G06F 13/1678 711/105 |

OTHER PUBLICATIONS

JEDEC Solid State Technology Association, "Low Power Double Data Rate (LPDDR) SDRAM Standard", JESD209B, Feb. 2010, 76 pp.

(Continued)

*Primary Examiner* — Hal Schnee
(74) *Attorney, Agent, or Firm* — Konrad Raynes Davda & Victor LLP; David W. Victor

(57) ABSTRACT

Provided are a device, system, and method for mapping memory controller connectors to memory connectors. A memory is programmed to transmit for each of a plurality of the memory data connectors, a pattern on the memory data connectors that has a first value for a selected memory data connector of the memory data connectors and a different value from the first value for the memory data connectors other than the selected memory data connector. For each of the memory data connectors, a read command is issued to read the pattern on the memory data connectors. a device data connector receiving the first value in the read pattern is mapped to the selected memory data connector transmitting the first value.

21 Claims, 5 Drawing Sheets

(56) References Cited

OTHER PUBLICATIONS

JEDEC Solid State Technology Association, "Low Power Double Data Rate 3 (LPDDR3)", JESD209-3, May 2012, 140 pp.

International Search Report and Written Opinion for PCT Application No. PCT/US2013/062474, dated Jun. 25, 2014, 11 pp.
International Preliminary Report on Patentability for PCT Application No. PCT/US2013/062474, dated Mar. 29, 2016. 6 pp.

* cited by examiner

| I/O Pin | Bit Sequence | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| DQ0 | 1 | 1 | 1 | 1 | 1 | 1 | 1 | 1 | 1 | 1 | 1 | 1 | 1 | 1 | 1 | 1 |
| DQ1 | 0 | 0 | 0 | 0 | 0 | 0 | 0 | 0 | 0 | 0 | 0 | 0 | 0 | 0 | 0 | 0 |
| DQ2 | 0 | 0 | 0 | 0 | 0 | 0 | 0 | 0 | 0 | 0 | 0 | 0 | 0 | 0 | 0 | 0 |
| DQ3 | 0 | 0 | 0 | 0 | 0 | 0 | 0 | 0 | 0 | 0 | 0 | 0 | 0 | 0 | 0 | 0 |
| DQ4 | 0 | 0 | 0 | 0 | 0 | 0 | 0 | 0 | 0 | 0 | 0 | 0 | 0 | 0 | 0 | 0 |
| DQ5 | 0 | 0 | 0 | 0 | 0 | 0 | 0 | 0 | 0 | 0 | 0 | 0 | 0 | 0 | 0 | 0 |
| DQ6 | 0 | 0 | 0 | 0 | 0 | 0 | 0 | 0 | 0 | 0 | 0 | 0 | 0 | 0 | 0 | 0 |
| DQ7 | 0 | 0 | 0 | 0 | 0 | 0 | 0 | 0 | 0 | 0 | 0 | 0 | 0 | 0 | 0 | 0 |
| DQ8 | 0 | 0 | 0 | 0 | 0 | 0 | 0 | 0 | 0 | 0 | 0 | 0 | 0 | 0 | 0 | 0 |
| DMI0 | 0 | 0 | 0 | 0 | 0 | 0 | 0 | 0 | 0 | 0 | 0 | 0 | 0 | 0 | 0 | 0 |
| DQ8 | 0 | 0 | 0 | 0 | 0 | 0 | 0 | 0 | 0 | 0 | 0 | 0 | 0 | 0 | 0 | 0 |
| DQ9 | 0 | 0 | 0 | 0 | 0 | 0 | 0 | 0 | 0 | 0 | 0 | 0 | 0 | 0 | 0 | 0 |
| DQ10 | 0 | 0 | 0 | 0 | 0 | 0 | 0 | 0 | 0 | 0 | 0 | 0 | 0 | 0 | 0 | 0 |
| DQ11 | 0 | 0 | 0 | 0 | 0 | 0 | 0 | 0 | 0 | 0 | 0 | 0 | 0 | 0 | 0 | 0 |
| DQ12 | 0 | 0 | 0 | 0 | 0 | 0 | 0 | 0 | 0 | 0 | 0 | 0 | 0 | 0 | 0 | 0 |
| DQ13 | 0 | 0 | 0 | 0 | 0 | 0 | 0 | 0 | 0 | 0 | 0 | 0 | 0 | 0 | 0 | 0 |
| DQ14 | 0 | 0 | 0 | 0 | 0 | 0 | 0 | 0 | 0 | 0 | 0 | 0 | 0 | 0 | 0 | 0 |
| DQ15 | 0 | 0 | 0 | 0 | 0 | 0 | 0 | 0 | 0 | 0 | 0 | 0 | 0 | 0 | 0 | 0 |
| DMI1 | 0 | 0 | 0 | 0 | 0 | 0 | 0 | 0 | 0 | 0 | 0 | 0 | 0 | 0 | 0 | 0 |

MAPPING MEMORY CONTROLLER CONNECTORS TO MEMORY CONNECTORS

TECHNICAL FIELD

Embodiments described herein generally relate to a memory system in which a memory controller communicates on a single channel or bus with multiple memory chips or modules that have a pin layout compatible with the slots coupled to the channel and memory controller.

BACKGROUND

A memory controller may support a protocol used by the multiple memory modules coupled to a channel, such as the Joint Electron Device Engineering Council (JEDEC) Double Date Rate Third Generation (DDR) Synchronous Dynamic Random Access Memory (SDRAM) protocol, JEDEC SDRAM Low Power Double Data Rate 3 (LPDDR3), etc. Before using the memory channel, the memory controller configures the memory chips in the memory modules for operations.

BRIEF DESCRIPTION OF THE DRAWINGS

Embodiments are described by way of example, with reference to the accompanying drawings, which are not drawn to scale, in which like reference numerals refer to similar elements.

FIG. 6 illustrates an embodiment of a bit pattern transmitted to map a connector on the memory chip to a connector on the memory controller.

DESCRIPTION OF EMBODIMENTS

Figure 1:
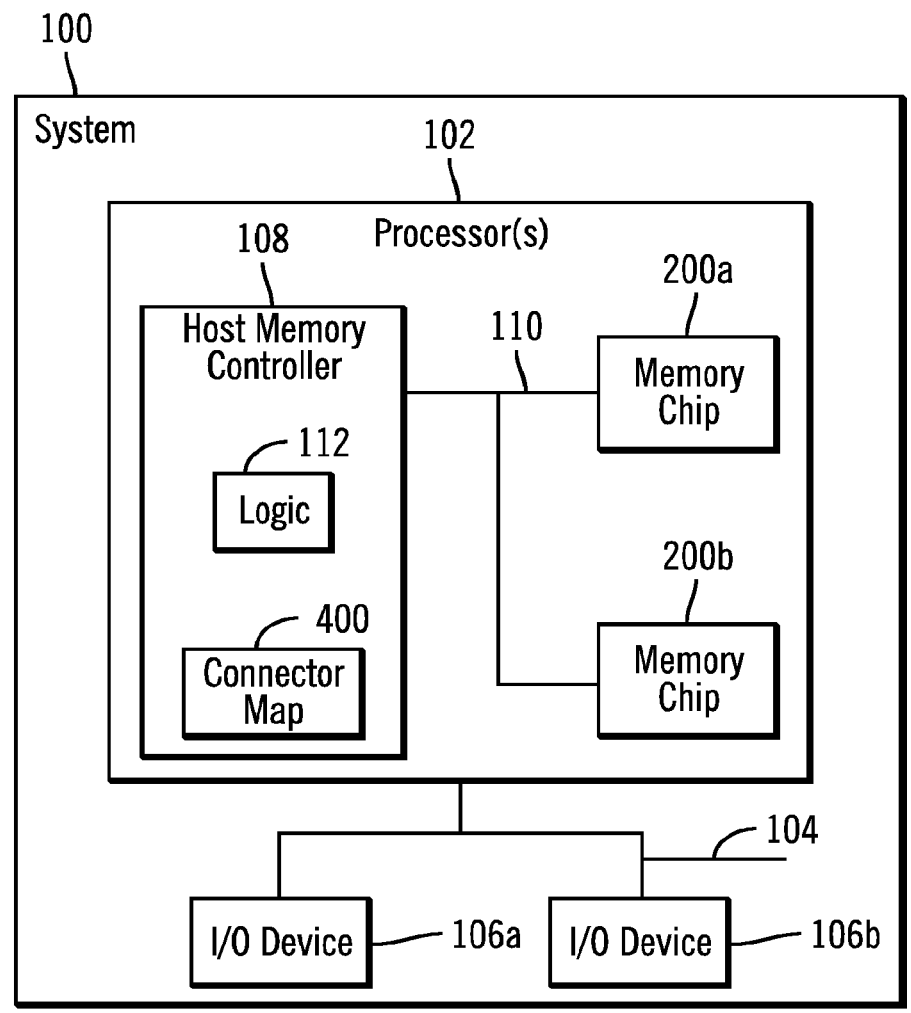
FIG. 1 illustrates an embodiment of a system having a memory system.

In certain memory implementations, the data in or out connectors (e.g. DQ pins) on the memory chip are swizzled to optimize for routing. Because of the swizzling, the memory controller must dynamically deswizzle the pins which involves determining a mapping of pins on the memory controller to the pins on the memory chip or module. The DQ pins may be swizzled within a nibble or a byte depending on number of data strobes covering the DQ pins. If a single data strobe is covering a byte, then DQ pins are swizzled and length matched within the byte. However, certain memory devices, such as LPDDR2 and LPDDR3, do not allow for swizzling. Other memory devices, such as DDR4, provide complex training methods to determine the mapping of pins on the memory controller to the pins on the memory module. In DDR4, a serial and parallel mode of operation are defined for reads from a MPR (multi-purpose register).

Described embodiments provide techniques for the memory controller to determine a mapping of the data connectors on the memory chip, such as the data input and output pins (DQ pins), to the connectors on the memory controller by programming the memory chip to transmit instances of a bit pattern for each of the connectors on the memory chip to map. In each instance of the transmission of the pattern, the memory controller determines a connector on the memory controller receiving a first bit value as opposed to a different bit value received on the other of the data connectors. The memory controller is able to determine from the instance of the transmission of the bit patterns the memory device connector transmitting the first bit value and thus map the memory chip connector transmitting the first value to the connector on the memory controller receiving that first value. Once this mapping is performed, the read training sequence may be performed to ready the memory controller and memory chip for I/O operations.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Certain embodiments relate to memory devices electronic assemblies. Embodiments include both devices and methods for forming electronic assemblies.

FIG. 1 illustrates an embodiment of a computing system 100 including one or more processors 102 that connect over a bus 104 with one or more Input/Output (I/O) devices 106a, 106b, such as additional storage or memory, display devices, input devices, etc. The processor 102 integrated circuit may include a memory controller 108 that communicates with memory chips 200a, 200b over a memory channel 110 that routes signals between the memory chips 200a, 200b and the memory controller 108. The memory chips 200a, 200b may be directly mounted on the processor 102 package, such as a "package on package" implementation, where the memory chips 200a, 200b are installed on top of the processor 102 with a memory channel 108 standard interface to route signals between them. Alternatively, the memory chips 200a, 200b may be stacked on the processor 102 in a chip stacking implementation, or the memory devices 106a, 160b may be implemented in the same integrated circuit die implementing the processor 102 and the memory controller 108. The memory devices 200a, 200b communicate with the memory controller 108 via the memory channel 110. In a yet further embodiment, the memory chips 200a, 200b may be implemented on the system 100 motherboard on separate packages or multiple chips on a single memory module or package.

The memory controller 108 includes logic 112 that implements the operations of the memory controller 108 and a connector map 400 that provides a mapping of HMC data connectors on the memory channel 110 to memory data connectors on one of the memory chips 200a, 200b so that in the event the memory data connectors are swizzled, the connector map 400 provides the relationship of the HMC data connectors to the memory chip data connectors to allow communication therebetween. There may be one separate connector map 400 for each memory chip 200a, 200b.

In one embodiment, the system 100 comprises a mobile or small computer device, such as a smartphone, digital camera, etc., and the memory chips 200a, 200b may comprise Low Power Double Data Rate (LPDDR) memory chips, such as LPDDR3, LPDDR4, etc. In alternative embodiments, the memory chips 200a, 200b may comprise other memory chips, such as Double Data Rate (DDR) memories. In further embodiments, the memory chips 200a, 200b may be mounted on a memory module. In further embodiments, the system 100 may comprise a computing device other than a mobile or small computing device.

Figure 2:
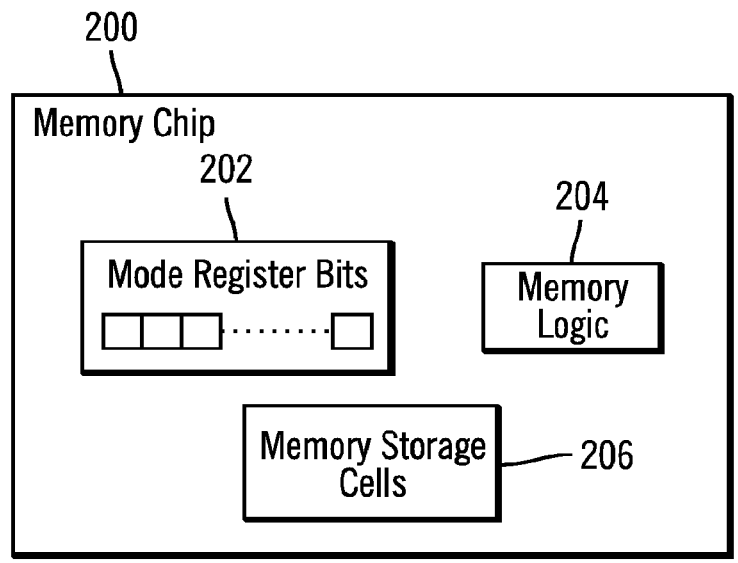
FIG. 2 illustrates an embodiment of a memory chip.

FIG. 2 illustrates an embodiment of a memory chip 200, comprising one of the memory chips 200a and 200b. The memory chip 200 includes mode register bits 202, memory logic 204 to perform operations in response to commands from the memory controller 108, e.g., read, write, and mode register commands, and memory storage cells 206 to store the data for the memory chip 200 in addressable locations. The mode register 202 bits may are used to define a mode of operation.

The code or logic implementing the memory logic 204 and the memory controller logic 112 may be encoded in hardware logic, such as in an Application Specific Integrated Circuit (ASIC), Field Programmable Gate Array (FPGA), etc.

Figure 3:
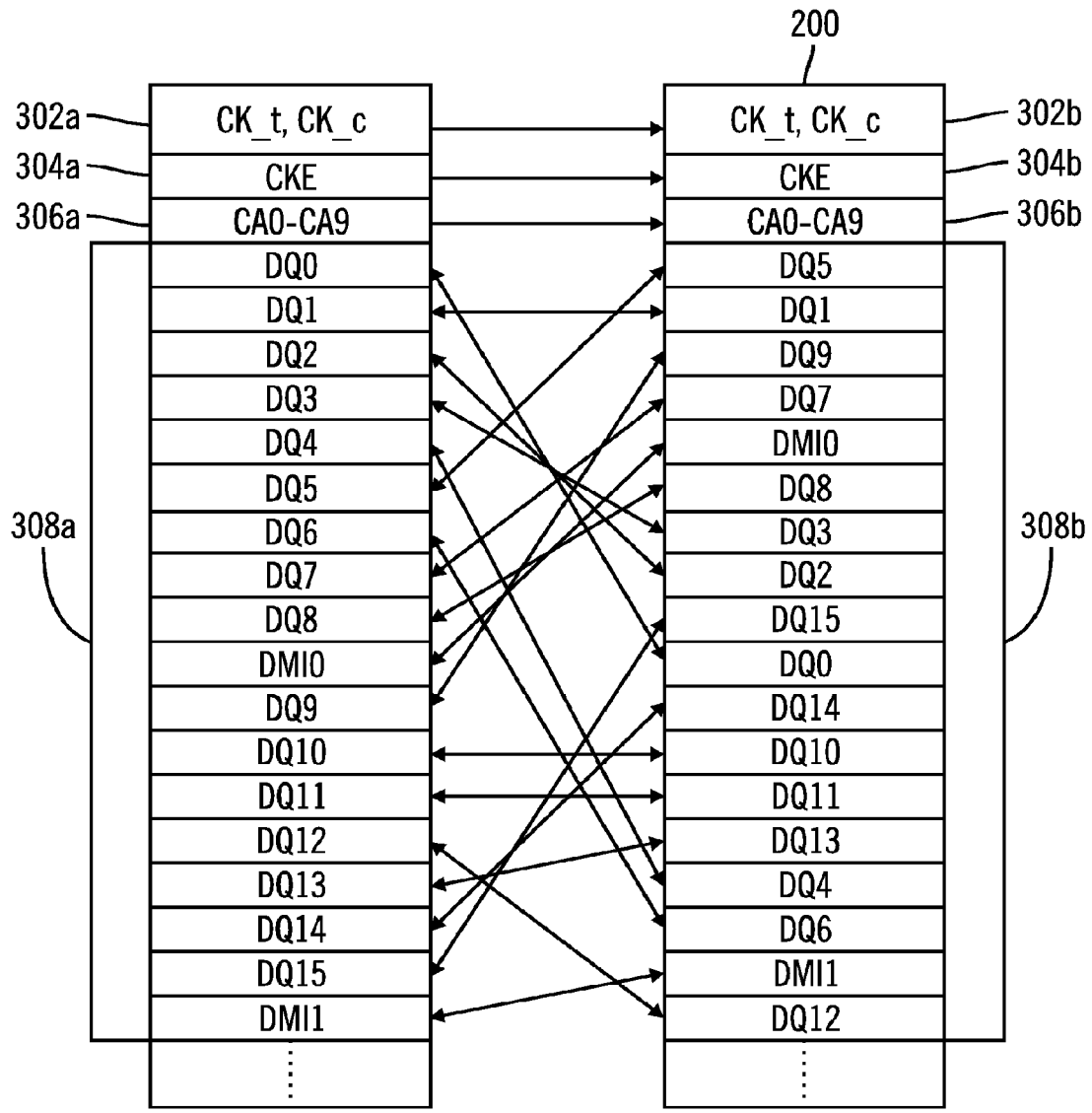
FIG. 3 illustrates an embodiment of a swizzle of connectors on the memory controller to connectors on the memory chip.

FIG. 3 illustrates an arrangement of a connector layout of the connectors, where the connectors comprise pins, solder balls, or other electrically coupling structures, of the HMC 108 connectors and the memory 200 connectors. In FIG. 3, the connector designations include, by way of example and without limitation, differential clock inputs 302a, 302b; clock enable (CKE) signal pins 304a, 304b; command address (CA) pins 306a, 306b; and bi-directional data Input/Output (I/O) (DQ0 . . . DQ15) and input data mask (DM0-DM1) pins 308a . . . 308b. The DQ and DM connectors 308a and 308b are swizzled on the memory channel 110 between the memory controller 108 and the memory module 200. The memory controller 108 needs to determine the connector map 400 to associate the DQ and DM connectors 308a on the memory controller 108 with the corresponding memory pins 308b on the memory chip 200, which may differ depending on the connector layout of the memory 200. There may be additional connectors for additional purposes on the connector layout, such as power supply pins, additional DQ and DM connectors for a 32 bit bus, as opposed to the 16 bit bus shown in FIG. 3.

Figure 4:
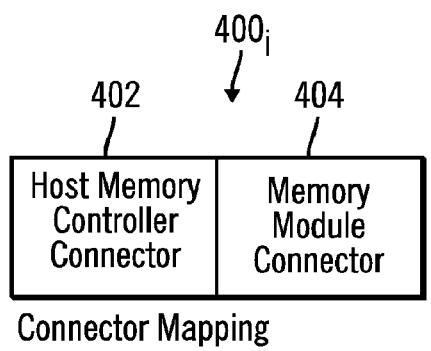
FIG. 4 illustrates an embodiment of a connector mapping associating a memory controller data connector to one data connector on the memory chip.

FIG. 4 illustrates an embodiment of an instance of an entry 400, in the connector map 400 associating one memory controller connector 402, e.g., DQ and DM connector, with one of the memory connectors 404. For instance, the memory controller 402 pin may comprise a pin number and the memory module pin 404 may identify the pin name, e.g., DQ0-DQ15, DM0, DM1, etc.

Figure 5A:
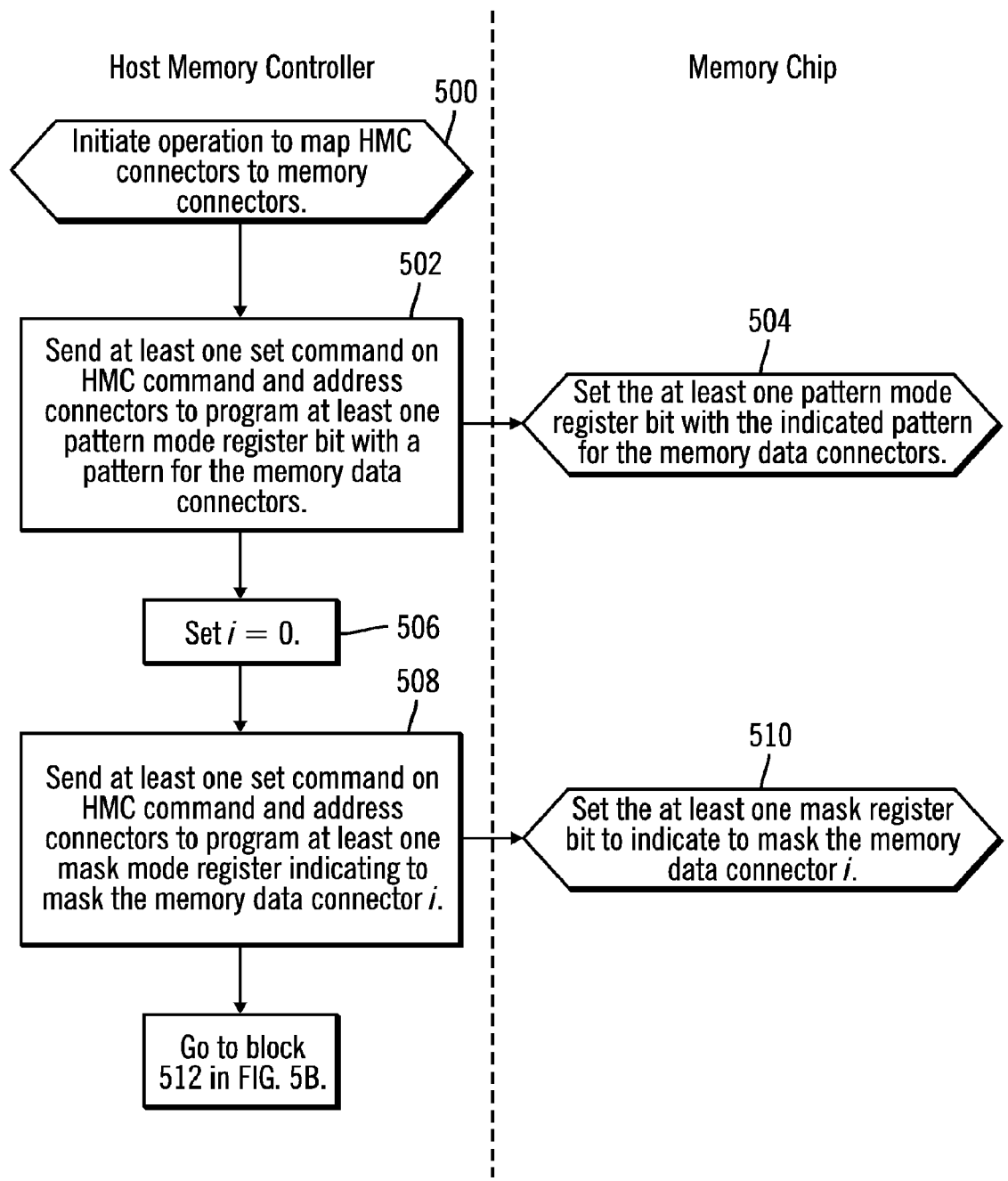
FIGS. 5a and 5b illustrate an embodiment of operations for a memory controller to map data connectors from the memory chip to data connectors on the memory controller.
Figure 5B:
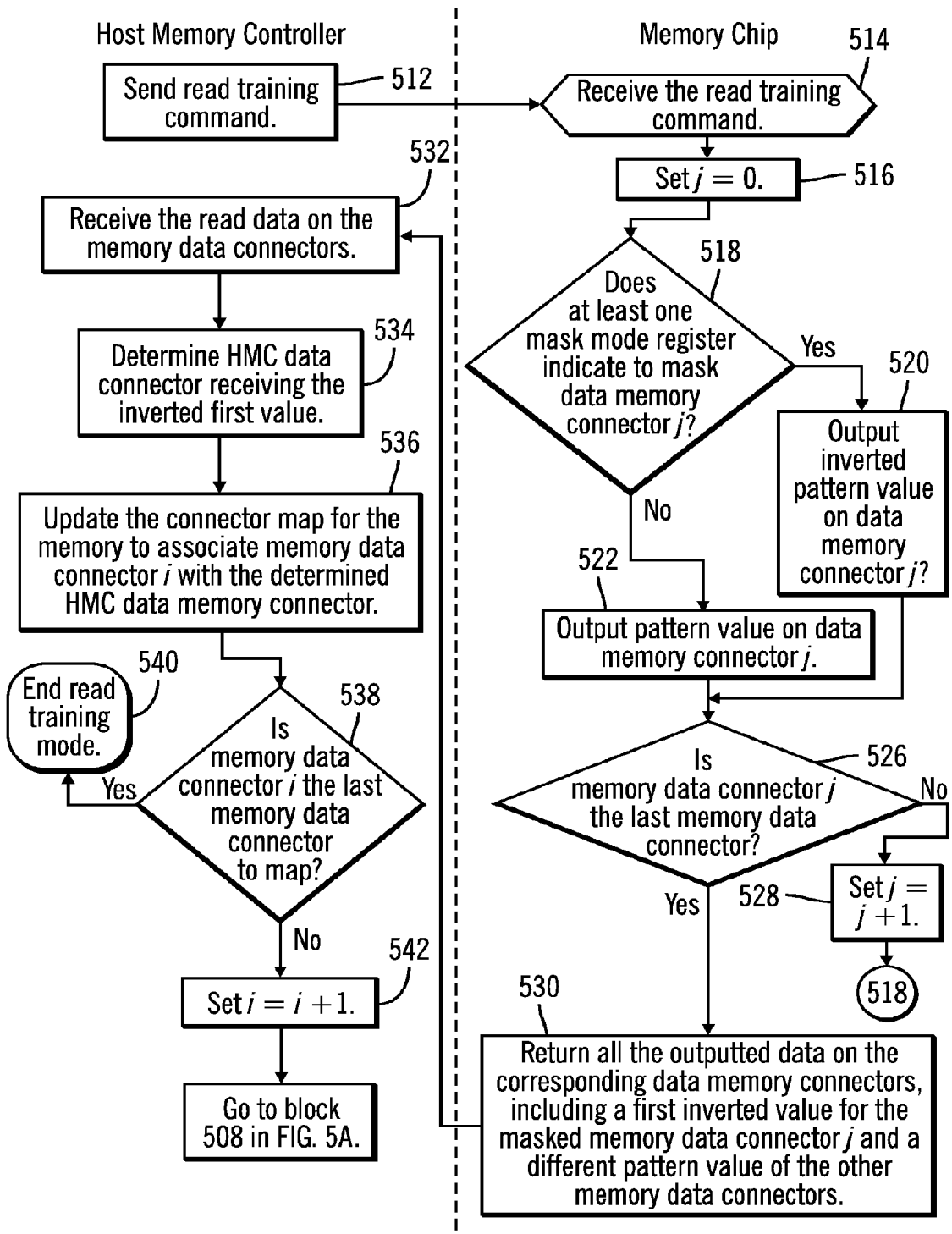

FIGS. 5a and 5b illustrate an embodiment of operations performed by the memory controller logic 110 and the memory module controller 202 logic to allow the memory controller logic 110 to determine the connector map 400 for the data connectors, e.g., DQ0-DQ15. Upon initiating (at block 500) an operation to deswizzle or map the memory controller data (HMC) connectors 308a to the memory data connectors 308b, e.g., DQ connectors, the HMC logic 112 sends (at block 502) at least one mode register (MR) set command on the HMC command and address connectors 306a to program at least one pattern mode register bit 202 with a pattern for the memory data connectors. For instance, in one implementation, if there is one mode register providing a bit for a pattern for the data connectors DQ0-DQ7 and another mode register bit for the pattern for connectors DQ8-DQ-15, then each of these pattern mode register bits would be programmed with a pattern value to output on the connectors DQ0-DQ15, such as a zero. There may be more or fewer pattern mode register bits depending on the number of data connectors on the memory 200.

In response to sending the at least one command to program the pattern mode register bits, the memory logic 204 sets (at block 504) the pattern mode register bits 202 providing pattern values for the data connectors, e.g., DQ0-DQ15, to the provided pattern value, e.g., zero.

After programming the pattern for the mode registers 202, the HMC logic 204 sets (at block 506) a variable i to zero and then performs the operations at blocks 508, 512, and 532-542 for each data connector (e.g., DQ0-DQ15) to map in the connector map 400.

The HMC logic 112 sends (at block 508) at least one set command on the HMC command and address connectors 306a to program at least one mask mode register 202 indicating to mask the memory data connector i, where the other memory data connectors other than connector i are not masked. In response to the at least one mode register set command for the mask, the memory logic 204 sets (at block 510) the at least one mask mode register bit 202 to indicate to mask the memory data connector i. The mask may indicate to invert the pattern value for the data connector that is indicated as masked, so that a different first value is produced for the masked data connector than the value produced for the other data connectors.

For instance, if there are two pattern mode registers and two mask mode registers indicating the memory data connector to mask, then the pattern mode registers, e.g., MR32 and MR40, for the DQ0-DQ15 may be set to 0 and one of the mask mode registers, e.g., MR15 and MR20, may be set to indicate which data connector to mask or invert to be outputted as a different value, e.g., 1, then the pattern value, e.g., 0. So the mask indicates the data connector to mask or the data connector whose pattern value will be inverted, whereas the pattern value, e.g., 0, is outputted for the data connectors not masked. If there are multiple mask mode registers for the data connectors, where each mask mode register may correspond to a different subset of the data connectors, then the mask mode registers not including the data connector to mask are not masked. For instance, if DQ0 is to be masked, or inverted to output a different value, e.g., 1, than the pattern value, e.g., 0, then the MR15 as the mask mode register for DQ0-DQ7 indicates to mask DQ0, where the MR20 register for DQ08-DQ15 indicates that no data connector DQ8-DQ15 is masked because DQ0 is to be masked.

After sending the command to program the mask mode register to mask the memory data connector i, control proceeds to block 512 in FIG. 5b where the HMC logic 112 sends a read training command to the memory chip 200 to output the data indicated in the pattern and mask mode register bits 202 on the memory data connectors (DQ0-DQ15). Upon receiving the read training command, the memory logic 204 sets (at block 516) a variable j to zero and if (at block 518) one of the mask mode register bits 202 indicates to mask the data memory connector j, e.g., DQj, then the memory logic 204 outputs (at block 520) the inverted pattern value of the value indicated in the pattern mode register for the data connector. In this way, the mask indicates a bit on which an inversion function is performed. If (at block 518) no mask mode register 202 indicates to mask data connector j, then the memory logic 204 outputs (at block 422) the pattern value indicated in the pattern mode register 202 for memory data connector j. After (from block 520 or 522) determining the value to output for memory data connector j, if the memory data connector j is not the last memory data connector to map, then j is incremented (at block 528) and control proceeds back to block 518 to determine the next value to output for the next memory data connector, e.g., the pattern value or the inverted pattern value. If (at block 526) memory data connector j is the last one to map, then the memory logic 204 returns (at block 530) for the read command, all the outputted data on the corresponding data memory connectors, including a first inverted value (e.g., 1) for the masked memory data connector j (e.g., DQ0 for the first iteration) and a different pattern value (e.g., 0) for the other memory data connectors (e.g., DQ1-DQ15 on the first iteration).

FIG. 6 illustrates an embodiment of a pattern 600 outputted to map the first memory data connector DQ0 602, where DQ1 has a masked first value, e.g., 1, different from the pattern value for all the other data connectors DQ2-DQ15.

Upon the memory controller 104 receiving (at block 532) the read data on all the HMC data connectors 308a (DQ0-DQ15), the HMC logic 204 determines (at block 534) the HMC data connector receiving the inverted first value, e.g., 1, where all the other HMC data connectors receive the pattern value, e.g., 0. The connector map 400 for the memory 200 is updated (at block 536) to associate the memory data connector i for which mask was programmed in the mask mode registers 202 with the determined HMC data memory connector receiving the inverted mask first value. If (at block 538) the memory data connector i is the last memory data connector to map, e.g., DQ15 or i=15, then read training mode is ended (at block 540). Otherwise, if there are further data memory connectors to map, e.g., DQ(i+1)-DQ15, then i is incremented (at block 542) and control returns to block 508 in FIG. 5a to program the mask mode register bits 202 for the next memory data connector to map.

With described embodiments, the pattern is programmed first in the memory mode register bits 202 for the data memory connectors being mapped and the mask mode register corresponding to the data memory connector to map is set to indicate to invert the value for the connector to map. In this way, when the HMC 108 reads in training mode the pattern indicated in the pattern mode registers for the data memory connectors 308b, the value for the masked data connector is inverted from the pattern to produce a first value, e.g., 1, that is different from the pattern value used for the other data connector. This allows the HMC 108 to identify the memory data connector 308b which was masked to determine the HMC data connector 308a that received the masked or inverted bit, i.e., is connected to the masked memory data connector 308b on the memory channel 110, to allow deswizzling of the memory data connectors 308b. During read and write operations, the HMC 108 uses the connector map 400 to determine the memory data connector 308b that transmitted data.

In certain embodiments, the pattern is programmed once in the pattern mode registers, and for each data connector to map an iteration of the operations to set the mask to indicate the data connector for which the inverted value will be outputted With certain described embodiments, the multi-purpose mode registers are programmed to indicate the pattern and the masked data connector, where the pattern is set once and the mask is set for each memory data connector to map. In alternative embodiments, other types of registers in the memory that may be used to set values used in read training may be used to set the pattern for the data connectors once and the mask for the data connector being mapped in a particular iteration of the operations through each of the memory data connectors 308b.

Once the data connectors are mapped, the HMC 108 may map the data mask connectors (DMI pins) by turning on data bus inversion for reads and programming a certain pattern to the memory that will result in inversion of the DMI pins, so that each of the DMI pins may be separately inverted when mapping each of the pins. For instance, one pattern is all 1's written to the memory 200 on DQ0-DQ7, and then a read will result in DMI0 pin being set to 1 and data inverted on DQ0-DQ7 with all 0s.

Described embodiments provide techniques for deswizzling the pins on a memory chip at a memory controller by programming the memory chip to transmit an instance of bit patterns on the memory data connectors to map for each of the memory data connectors, wherein for each of the memory data connectors, the pattern value is sent for all the data connectors accept for one masked data connector to allow the mapping of that data connector. The memory controller 108 may then map the HMC data connector receiving the first bit inverted value to the data connector that was programmed to transmit the inverted first value, different from the value transmitted for other of the memory data connectors. This allows for deswizzling of the data connectors on the memory chip 200 so that the memory chip and memory controller may operate in systems having different pin layout architectures.

The logic or code of the described embodiments may be stored or recorded in a "computer readable storage medium", including at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmissions signals. Those skilled in the art will recognize that many modifications may be made to this configuration without departing from the scope of the present invention, and that the article of manufacture may comprise suitable information bearing medium known in the art.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

EXAMPLES

The following examples pertain to further embodiments.

Example 1 is a device coupled to a memory via a memory channel, wherein the memory has memory connectors including memory data connectors to the memory channel, comprising: device connectors to the memory channel including device data connectors that connect to the memory data connectors on the memory; logic that when executed performs operation, comprising: programming the memory to transmit for each of the memory data connectors, a pattern on the memory data connectors that has a first value for a selected memory data connector of the memory data connectors and a different value from the first value for the data connectors other than the selected memory data connector; for each of the memory data connectors, performing: issuing a read command to read the pattern on the memory data connectors; mapping the device data connector receiving the first value in the read pattern to the selected memory data connector transmitting the first value.

In Example 2, the subject matter of Example 1 can optionally include that the programming the memory to transmit for each of the memory data connectors the pattern comprises: programming the pattern in the memory once for the memory data connectors; and for each of the memory data connectors performing an instance of the programming the memory to indicate the selected memory data connector on which the first value is transmitted.

In Example 3, the subject matter of Example 2 can optionally include that the performing for each of the memory data connectors the instance of the programming the memory to indicate the selected memory data connector on which the first value is transmitted comprises programming a mask in the memory indicating the selected memory data connector on which the first value is transmitted.

In Example 4, the subject matter of Example 3 can optionally include that the first value is different from the value indicated in the pattern for the selected memory data connector.

In Example 5, the subject matter of Example 4 can optionally include that the mask causes the memory to invert the value in the pattern for the selected memory data connector indicated in the mask to produce the first value.

In Example 6, the subject matter of Example 3 can optionally include that the programming in the memory the pattern and the performing for each of the memory data connectors the programming the memory to indicate the selected memory data connector comprises programming bits in a mode register of the memory.

In Example 7, the subject matter of Example 3 can optionally include that the programming the pattern comprises programming at least one pattern mode register bit to indicate the pattern and wherein performing the instance of the programming of the memory for each of the memory data connectors comprises programming at least one mask mode register bit to indicate the selected memory data connector on which the first value is transmitted.

In Example 8, the subject matter of Example 7 can optionally include that the first value outputted for the selected memory data connector indicated in the at least one mask mode register bit is different from a value provided for the selected memory data connector in the at least one pattern mode register bit.

In Example 9, the subject matter of Example 8 can optionally include that the at least one pattern mode register bit indicates a pattern of all zeroes for the memory data connectors, and wherein the first value comprises a one.

In Example 10, the subject matter of Example 8 can optionally include that the programming the at least one mask mode register bit causes the memory to output the first value for the selected memory data connector indicated in the at least one mask mode register bit and output the pattern indicated in the at least one pattern mode register bit for the memory data connectors other than the selected memory data connector, wherein the first value comprises an inversion of a value in the pattern indicated in the at least one mask mode register bit for the selected memory data connector.

In Example 11, the subject matter of Example 7 can optionally include that the programming the at least one pattern mode register bit comprises programming a plurality of pattern mode register bits, wherein each pattern mode register bit provides pattern values for a subset of the memory data connector pins and wherein the programming the at least one mask mode register bit comprises programming a plurality of mask mode register bits to indicate the selected memory data connector on which the first value is produced.

Example 12 is a system including a memory controller; a memory module; a memory channel to couple the memory controller and the memory module, comprising memory connectors on the memory module including memory data connectors and memory controller connectors on the memory controller including memory controller data connectors that each connect to one of the memory data connectors to transmit data. The memory controller includes logic that when executed performs operation, comprising: programming the memory to transmit for each of the memory data connectors, a pattern on the memory data connectors that has a first value for a selected memory data connector of the memory data connectors and a different value from the first value for the data connectors other than the selected memory data connector; for each of the memory data connectors, performing: issuing a read command to read the pattern on the memory data connectors; mapping the device data connector receiving the first value in the read pattern to the selected memory data connector transmitting the first value.

In Example 13, the subject matter of Example 12 can optionally include that the programming the memory to transmit for each of the memory data connectors the pattern comprises: programming the pattern in the memory once for the memory data connectors; and for each of the memory data connectors performing an instance of the programming the memory to indicate the selected memory data connector on which the first value is transmitted.

In Example 14, the subject matter of Example 13 can optionally include that the performing for each of the memory data connectors the instance of the programming the memory to indicate the selected memory data connector on which the first value is transmitted comprises programming a mask in the memory indicating the selected memory data connector on which the first value is transmitted.

In Example 15, the subject matter of Example 14 can optionally include that the first value is different from the value indicated in the pattern for the selected memory data connector.

In Example 16, the subject matter of Example 14 can optionally include that the programming the pattern comprises programming at least one pattern mode register bit to indicate the pattern and wherein performing the instance of the programming of the memory for each of the memory data connectors comprises programming at least one mask mode register bit to indicate the selected memory data connector on which the first value is transmitted.

In Example 17, the subject matter of Example 16 can optionally include that the first value outputted for the selected memory data connector indicated in the at least one mask mode register bit is different from a value provided for the selected memory data connector in the at least one pattern mode register bit.

In Example 18, the subject matter of Example 17 can optionally include that the programming the at least one mask mode register bit causes the memory to output the first value for the selected memory data connector indicated in the at least one mask mode register bit and output the pattern indicated in the at least one pattern mode register bit for the memory data connectors other than the selected memory data connector, wherein the first value comprises an inversion of a value in the pattern indicated in the at least one mask mode register bit for the selected memory data connector.

Example 9 is a method comprising programming a memory to transmit for each of a plurality of the memory data connectors, a pattern on the memory data connectors that has a first value for a selected memory data connector of the memory data connectors and a different value from the first value for the memory data connectors other than the selected memory data connector; for each of the memory data connectors, performing: issuing a read command to read the pattern on the memory data connectors; mapping a device data connector receiving the first value in the read pattern to the selected memory data connector transmitting the first value.

In Example 20, the subject matter of Example 19 can optionally include that the programming the memory to transmit for each of the memory data connectors the pattern comprises: programming the pattern in the memory once for the memory data connectors; and for each of the memory data connectors performing an instance of the programming the memory to indicate the selected memory data connector on which the first value is transmitted.

In Example 21, the subject matter of Example 20 can optionally include that the performing for each of the memory data connectors the instance of the programming the memory to indicate the selected memory data connector on which the first value is transmitted comprises programming a mask in the memory indicating the selected memory data connector on which the first value is transmitted.

In Example 22, the subject matter of Example 21 can optionally include that the first value is different from the value indicated in the pattern for the selected memory data connector.

In Example 23, the subject matter of Example 21 can optionally include that the programming the pattern comprises programming at least one pattern mode register bit to indicate the pattern and wherein performing the instance of the programming of the memory for each of the memory data connectors comprises programming at least one mask mode register bit to indicate the selected memory data connector on which the first value is transmitted.

In Example 24, the subject matter of Example 23 can optionally include that the first value outputted for the selected memory data connector indicated in the at least one mask mode register bit is different from a value provided for the selected memory data connector in the at least one pattern mode register bit.

In Example 25, the subject matter of Example 24 can optionally include that the programming the at least one mask mode register bit causes the memory to output the first value for the selected memory data connector indicated in the at least one mask mode register bit and output the pattern indicated in the at least one pattern mode register bit for the memory data connectors other than the selected memory data connector, wherein the first value comprises an inversion of a value in the pattern indicated in the at least one mask mode register bit for the selected memory data connector.

Example 26 is an apparatus comprising a means for programming a memory to transmit for each of a plurality of the memory data connectors, a pattern on the memory data connectors that has a first value for a selected memory data connector of the memory data connectors and a different value from the first value for the memory data connectors other than the selected memory data connector; means for issuing a read command to read the pattern on the memory data connectors for each of the memory data connectors; and means for mapping a device data connector receiving the first value in the read pattern to the selected memory data connector transmitting the first value for each of the memory data connectors.

In Example 27, the subject matter of Example 25 can optionally include that the means for programming the memory to transmit for each of the memory data connectors the pattern comprises: means for programming the pattern in the memory once for the memory data connectors; and means for programming the memory to indicate the selected memory data connector on which the first value is transmitted for each of the memory data connectors.

In Example 28, the subject matter of Example 24 can optionally include that the means for performing for each of the memory data connectors the instance of the programming the memory to indicate the selected memory data connector on which the first value is transmitted comprises means for programming a mask in the memory indicating the selected memory data connector on which the first value is transmitted.

Example 29 is a device coupled to a memory via a memory channel, wherein the memory has memory connectors including memory data connectors to the memory channel, comprising: device connectors to the memory channel including device data connectors that connect to the memory data connectors on the memory; means for programming the memory to transmit for each of the memory data connectors, a pattern on the memory data connectors that has a first value for a selected memory data connector of the memory data connectors and a different value from the first value for the data connectors other than the selected memory data connector; means for issuing a read command to read the pattern on the memory data connectors for each of the memory data connectors; and means for mapping the device data connector receiving the first value in the read pattern to the selected memory data connector transmitting the first value for each of the memory data connectors.

In Example 30, the subject matter of Example 29 can optionally include that the means for programming the memory to transmit for each of the memory data connectors the pattern comprises: means for programming the pattern in the memory once for the memory data connectors; and means for programming the memory to indicate the selected memory data connector on which the first value is transmitted for each of the memory data connectors.

In Example 31, the subject matter of Example 30 can optionally include that the means programming the memory to indicate the selected memory data connector on which the first value is transmitted comprises: means for programming a mask in the memory indicating the selected memory data connector on which the first value is transmitted for each of the memory data connectors.

In Example 32, the subject matter of Example 31 can optionally include that the first value is different from the value indicated in the pattern for the selected memory data connector.

In Example 33, the subject matter of Example 32 can optionally include that the mask causes the memory to invert the value in the pattern for the selected memory data connector indicated in the mask to produce the first value.

In Example 34, the subject matter of Example 31 can optionally include that the means for programming in the memory the pattern and the performing for each of the memory data connectors the programming the memory to indicate the selected memory data connector comprises means for programming bits in a mode register of the memory.

In Example 35, the subject matter of Example 31 can optionally include that the means for programming the pattern comprises means for programming at least one pattern mode register bit to indicate the pattern and wherein the means for programming the mask for each of the memory data connectors comprises means for programming at least one mask mode register bit to indicate the selected memory data connector on which the first value is transmitted.

In Example 36, the subject matter of Example 35 can optionally include that the first value outputted for the selected memory data connector indicated in the at least one mask mode register bit is different from a value provided for the selected memory data connector in the at least one pattern mode register bit.

In Example 37, the subject matter of Example 36 can optionally include that the at least one pattern mode register bit indicates a pattern of all zeroes for the memory data connectors, and wherein the first value comprises a one.

In Example 38, the subject matter of Example 36 can optionally include that the means for programming the at least one mask mode register bit causes the memory to output the first value for the selected memory data connector indicated in the at least one mask mode register bit and output the pattern indicated in the at least one pattern mode register bit for the memory data connectors other than the selected memory data connector, wherein the first value comprises an inversion of a value in the pattern indicated in the at least one mask mode register bit for the selected memory data connector.

In Example 39, the subject matter of Example 35 can optionally include that the means for programming the at least one pattern mode register bit comprises means for programming a plurality of pattern mode register bits, wherein each pattern mode register bit provides pattern values for a subset of the memory data connector pins and wherein the means for programming the at least one mask mode register bit comprises means for programming a plurality of mask mode register bits to indicate the selected memory data connector on which the first value is produced.

Example 40 is a system comprising the memory and the device in any of the preceding Examples 29-39.

What is claimed is:

1. A device comprising:
   device data connectors that connect to a memory channel connecting to memory data connectors on a memory;
   logic that when executed is to:
      program the memory to indicate a pattern specifying a value to output for each of the memory data connectors;
      for each of the memory data connectors comprising a selected memory data connector of the memory data connectors, perform:
         program the memory to mask the selected memory data connector, wherein the program the memory to mask the selected memory data connector is to cause the selected memory data connector to output a mask value different from the value specified by the pattern;
         issue a read command to read the pattern of the values on the memory data connectors; and
         map a device data connector of the device data connectors receiving the mask value in the read pattern to the selected memory data connector transmitting the mask value.

2. The device of claim 1, wherein the program the memory to mask the selected memory data connector comprises program a mask in the memory indicating the selected memory data connector on which the mask value is transmitted.

3. The device of claim 2, wherein the mask value is different from the value indicated in the pattern for the selected memory data connector.

4. The device of claim 3, wherein the mask is to cause the memory to invert the value in the pattern for the selected memory data connector indicated in the mask to produce the mask value.

5. The device of claim 2, wherein the program the memory to indicate the pattern and the perform for each of the memory data connectors the program the memory to mask the selected memory data connector comprises program bits in a mode register of the memory.

6. The device of claim 2, wherein the program the memory to indicate the pattern comprises program at least one pattern mode register bit to indicate the pattern and wherein the program the memory for each of the memory data connectors comprises program at least one mask mode register bit to indicate the selected memory data connector on which the mask value is transmitted.

7. The device of claim 6, wherein the mask value outputted for the selected memory data connector indicated in the at least one mask mode register bit is different from the value provided for the selected memory data connector in the at least one pattern mode register bit.

8. The device of claim 7, wherein the at least one pattern mode register bit indicates a pattern of all zeroes for the memory data connectors, and wherein the mask value comprises a one.

9. The device of claim 7, wherein the program the at least one mask mode register bit is to cause the memory to output the mask value for the selected memory data connector indicated in the at least one mask mode register bit and output the value for the pattern indicated in the at least one pattern mode register bit for the memory data connectors other than the selected memory data connector, wherein the mask value comprises an inversion of the value in the pattern indicated in the at least one mask mode register bit for the selected memory data connector.

10. The device of claim 6, wherein the program the at least one pattern mode register bit comprises program a plurality of pattern mode register bits, wherein each pattern mode register bit provides pattern values for a subset of memory data connector pins and wherein the program the at least one mask mode register bit comprises program a plurality of mask mode register bits to indicate the selected memory data connector on which the mask value is produced.

11. A system, including:
a memory controller;
a memory module;
a memory channel to couple the memory controller and the memory module, comprising memory data connectors on the memory module and memory controller data connectors on the memory controller, wherein each of the memory controller data connectors connect to one of the memory data connectors to transmit data;
wherein the memory controller includes logic to:
program the memory module to indicate a pattern specifying a value to output for each of the memory data connectors;
for each of the memory data connectors comprising a selected memory data connector of the memory data connectors, perform:
program the memory module to mask the selected memory data connector, wherein the program the memory module to mask the selected memory data connector is to cause the selected memory data connector to output a mask value different from the value specified by the pattern;
issue a read command to read the pattern of the values on the memory data connectors; and
map a memory controller data connector of the memory controller data connectors receiving the mask value in the read pattern to the selected memory data connector transmitting the mask value.

12. The system of claim 11, wherein the program the memory module to mask the selected memory data connector comprises program a mask in the memory module indicating the selected memory data connector on which the mask value is transmitted.

13. The system of claim 12, wherein the mask value is different from the value indicated in the pattern for the selected memory data connector.

14. The system of claim 12, wherein the program the memory module to indicate the pattern comprises program at least one pattern mode register bit to indicate the pattern and wherein the program of the memory module for each of the memory data connectors comprises program at least one mask mode register bit to indicate the selected memory data connector on which the mask value is transmitted.

15. A method, comprising:
programming a memory to indicate a pattern specifying a value to output for each of a plurality of memory data connectors;
for each of the memory data connectors connected to the memory comprising a selected memory data connector of the memory data connectors, performing:
programming the memory to mask the selected memory data connector, wherein the program the memory to mask the selected memory data connector is to cause the selected memory data connector to output a mask value different from the value specified by the pattern;
issuing a read command to read the pattern of the values on the memory data connectors; and
mapping a device data connector of device data connectors receiving the mask value in the read pattern to the selected memory data connector transmitting the mask value.

16. The method of claim 15, wherein the programming the memory to mask the selected memory data connector comprises programming a mask in the memory indicating the selected memory data connector on which the mask value is transmitted.

17. The method of claim 15, wherein the programming the memory to indicate the pattern comprises programming at least one pattern mode register bit to indicate the pattern and wherein the programming of the memory for each of the memory data connectors comprises programming at least one mask mode register bit to indicate the selected memory data connector on which the mask value is transmitted.

18. The method of claim 17, wherein the mask value outputted for the selected memory data connector indicated in the at least one mask mode register bit is different from the value provided for the selected memory data connector in the at least one pattern mode register bit.

19. The method of claim 18, wherein the programming the at least one mask mode register bit is to cause the memory to output the mask value for the selected memory data connector indicated in the at least one mask mode register bit and output the value for the pattern indicated in the at least one pattern mode register bit for the memory data connectors other than the selected memory data connector, wherein the mask value comprises an inversion of the value in the pattern indicated in the at least one mask mode register bit for the selected memory data connector.

20. An apparatus, comprising:
a memory controller including logic to:
program a memory to indicate a pattern specifying a value to output for each of a plurality of memory data connectors;
for each of the memory data connectors connected to the memory comprising a selected memory data connector of the memory data connectors, perform:
program the memory to mask the selected memory data connector, wherein the program the memory to mask the selected memory data connector is to cause the selected memory data connector to output a mask value different from the value specified by the pattern;
issue a read command to read the pattern of the values on the memory data connectors for each of the memory data connectors; and
map a device data connector of device data connectors receiving the mask value in the read pattern to the selected memory data connector transmitting the mask value for each of the memory data connectors.

21. The apparatus of claim 20, wherein the the program the memory to mask the selected memory data connector comprises program a mask in the memory indicating the selected memory data connector on which the mask value is transmitted.

* * * * *